(12) United States Patent
Fish (10) Patent No.: US 7,693,898 B2
(45) Date of Patent: Apr. 6, 2010

(54) INFORMATION REGISTRY

(76) Inventor: Robert D. Fish, 2456 Comer La., Tustin, CA (US) 92782

( * ) Notice: Subject to any disclaimer, the term of this patent is extended or adjusted under 35 U.S.C. 154(b) by 226 days.

(21) Appl. No.: 11/625,934

(22) Filed: Jan. 23, 2007

(65) Prior Publication Data

US 2007/0179968 A1     Aug. 2, 2007

Related U.S. Application Data

(60) Provisional application No. 60/765,242, filed on Feb. 2, 2006.

(51) Int. Cl.
G06F 7/00     (2006.01)
(52) U.S. Cl. ..................... 707/708; 707/796
(58) Field of Classification Search ............ 707/1, 707/3, 102
See application file for complete search history.

(56) References Cited

U.S. PATENT DOCUMENTS

| | | | |
|---|---|---|---|
| 6,253,188 B1 * | 6/2001 | Witek et al. | 705/14 |
| 7,143,089 B2 * | 11/2006 | Petras et al. | 707/5 |
| 7,162,471 B1 * | 1/2007 | Knight et al. | 707/3 |
| 2007/0061487 A1 * | 3/2007 | Moore et al. | 709/246 |
| 2008/0155616 A1 * | 6/2008 | Logan et al. | 725/93 |

* cited by examiner

*Primary Examiner*—Etienne P LeRoux
*Assistant Examiner*—Cindy Nguyen
(74) *Attorney, Agent, or Firm*—Fish & Associates, PC (57) ABSTRACT

Systems and methods allow independent users to both search and classify third party information, in inconsistent ways, using lists of predefined topics. Users can preferably add their own topics, with the system providing information as to frequency of use of various topics to encourage conformity. Users are encouraged to classify third party material by having the ability to add and publish their own editorial or other comments on that third party material.

28 Claims, 14 Drawing Sheets

REMARKABLE™ — Search    Alert    User

100

120

| Author | Date | Title | Comment |
|---|---|---|---|
| Jehl, Douglas | 12/09/05 | The Reach of War: Intelligence; Qaeda-Iraq Lin | This author is completely off base. George Bush is a national hero. He is a man of God, and is saving our |
|  | December 2005 | The Reach of War: Intelligence; Qaeda-Iraq Lin | Excellent article; shows how Bush based his assertion of a link between Iraq and Al Qaeda on practically nothing |
| Jehl, Douglas | 12/09/05 | The Reach of War: Intelligence; Qaeda-Iraq Lin | Insightful article. Bookmark this on the road to tyranny. |
| Shane, Scott | 12/04/05 | Bush's Speech on Iraq War Echoes Voice of an Analyst | Bush says "victory" over and over again, trying to hide the fact that we have no war, and there can never be a |
| Wong, Edward | 12/12/05 | Iraq Prison Raid Finds a New Case of Mistreatment | Discovery of more than 600 prisoners packed into a cramped space cannot redound against Bush. This just pr |
| Bumiller, Elisabeth | 12/12/05 | Thursday's Election Won't Stop The Violence in Iraq. | Of course no progress is being made. Iraq will fall apart as soon as we leave, in 6 months or 6 years. |
| Bumiller, Elisabeth | 12/12/05 | Thursday's Election Won't Stop The Violence in Iraq. | Bush is merely trying to defuse opposition to his failed policies, by lowering expectations here at home. There is |

140

| Details | |
|---|---|
| Info Type | Newspaper article |
| Info Source | New York Times |
| Info Link | http://select.nytimes.com/gst/ab |
| Commentator | Boston, Bill G. |
| Comment Date | 01/10/06 |
| Expiration Date | 01/10/07 |

150

| Topics |
|---|
| What: Iraq War |
| What: Bush is a terrorist |
| What: Bush is a man of God |
| What: Oil |
| Where: Middle East |
| Who: Bush, George W. |

INFORMATION REGISTRY

This application claims priority to U.S. provisional application No. 60/765242, filed Feb. 2, 2006.

FIELD OF THE INVENTION

The field of the invention is electronic indexing of information.

BACKGROUND

As the quantity of electronically available information continues to grow, the ability of users to identify and retrieve relevant subsets of that information becomes ever more difficult. There are already several solutions in place, but none of them are entirely adequate.

Perhaps the most popular solutions are the Internet text search engines, including for example, Yahoo!™, Google™, and Microsoft™. These, along with numerous fee-for-service search engines such as Lexis™ and Westlaw™, index substantially every word in a document. While very useful in searching through large databases, such systems do have trouble filter out irrelevant contexts, especially where words have many meanings, (e.g., "chip" can relate to electronics, gaming, farming, timber, etc).

Some systems seek to improve the accuracy of text searching by attempting to discern the context intended by the author or searcher. For example, U.S. patent application 2005/0038781 to Ferrari et al, "Method and system for interpreting multiple-term queries" claims methods of interpreting queries by ranking candidate interpretations. Unfortunately, such systems can be incredibly complex, and still do not adequately accommodate the varying conceptual perspectives of different users.

Other systems seek to improve the accuracy of text searches through the use of keywords or other metadata. Unfortunately, addition of metadata generally requires human analysis, and is therefore expensive to implement. The Westlaw Key™ system was an early adoption of metadata, and proved very useful over the years. But the system has not always been expanded to keep pace with new concepts and distinctions, and the vast amount of effort involved in remaining current in even the legal field demonstrates the impracticality of that approach for a database that could cover essentially all fields. In addition, it is impossible for Westlaw, or any provider for that matter, to implement a formal taxonomy that would be equally suitable to all users. Any two people will necessarily view the very same information from different perspectives.

Still other systems focus on segmenting or otherwise parametizing the information. For example, Lexis™ segment searching classifies case law into segments, (opinion by; name, date, court, counsel, etc), and allows users to search for text within specified segments. In the product world, many retailers including Walmart.com™, Home Depot™, Kmart™, and Circuit City™, are reported to use the Endeca™ InFront™ software package to parametize their product offerings. The problem with these systems is that the classification systems are imposed in a top down format. Unless the system designer, operator or other agent updates the classification lists, the system is stagnant. And even if sufficient time is put into the system to make frequent changes, such systems can suffer from the fact that there is only a single classification (albeit possibly very complex), for any given item of information. The difficult fact is that there are often as many valid classifications as people viewing the data.

In my earlier patents, U.S. Pat. Nos. 6,035,294, 6,195,652, and 6,243,699, (which along with any other citations referenced herein are incorporated by reference in their entirety), I disclosed systems and methods for operating a self-evolving electronic marketplace in which substantially all goods and services could be described and located using sets of parameter/value pairs. That technology provided a self-evolving solution for classifying data, but only for structured databases, only for users to classify their own information, and only for information actually stored on the database. Indeed, one of the principal purposes of the technology was to implode the Internet by storing virtually all data on a single database.

The evolution in web pages and other non-structured data files went in just the other direction. Instead of allowing authors to tag data with their own metadata designators, various attempts were made to impose a top down structure of available metatags. The Dublin Core metadata project, (http://www.dublincore.org), for example, has sought to persuade users to add metadata to their pages in a consistent, reliable way. But as with all top down system, the "official" metatagging system can never keep pace with the needs of a widely varied user base. Indeed, many users prefer a "folksonomy" approach, in which users are encouraged to develop and implement tags without strict adherence to any particular guidelines. The idea is that over time users will tend to adopt tags that are used most frequently by others, and that less frequently used tags will eventually fall by the wayside. Some electronic bulletin boards, such as Gather, allow individuals to record their own content, and to categorize the content according to both a hierarchical topics tree, and user-originated tags. A recent listing on www.gather.com, for example, showed 134 pages of entries for the topic of World Events|International Events, with one author tagging his text with multiple tags (valour, japan, second world war, bravery, history, war, marines, American marines, and politics), at least some of which may have originated with that author.

Thus, it is known for authors to classify their own works in both structured databases (e.g., bulletin boards) and unstructured files (e.g., web pages), and it is known for database providers to classify the work of others according to the database provider's own, often proprietary, classification system (e.g., Lexis™ and Westlaw™). In some cases the classifications are fixed, and in other cases the classifications can be modified by the users. But all of those solutions fall because they fail to account for the over-riding facts that there are many valid ways to classify something, and no one entity can figure out what would be useful for different people. What is still needed are systems and methods that encourage users to classify the same information with at least some of the same designators, in different ways to achieve inconsistent classifications. Ideally, such users could also add their own designators, and would be guided in selection of designators by historical comparisons of previous usage.

SUMMARY OF THE INVENTION

The present invention provides systems and methods in which independent users classify third party information in inconsistent ways, at least in part using pre-defined classifications.

Users are contemplated to be human users acting in a non-technical capacity. This definition is meant to exclude programmers, system designers and the like acting in those technical capacities. Thus, a user is generally a member of the general public, but also includes situations where some restrictions apply, such as where the members are required to log on using an identification and a pass code. The users are preferably independent of the system, i.e., not employees, owners, operators, or other agents of the system.

It is contemplated that the presently disclosed systems and methods could classify all types of information, including for example text, video, and/or audio. Such information could be "intrinsic" because its primary store with within the system, or "extrinsic" as in the case of most web pages, because its primary store is extrinsic to the system. Classified information is preferably "third party" because it originated with someone other than the system and the user.

Classifications can use any type of designator, but are preferably words or phrases organized in two or three levels. Topics and other types of designators are contemplated to include all manner of conceptual groupings, including groupings that in other systems would be considered headings, tags, keywords, and so forth. Classifications can preferably be logically related according to a hierarchical or other taxonomy, and can preferably include multiple words and even phrases such as "global warming is a huge problem." At present a two-level classification is preferred, with the higher level grouping designators by field, who, what, where, when, why, how, action, and price. It is especially contemplated that users could add their own designators to the system, either more or less directly by simply typing in a new designator, or indirectly using a protocol by which a new designator must be adopted or confirmed by an agent of the system before being made available to others.

All types of information can be classified using the contemplated systems and methods, including, for example, audio and/or video tracks, blogs, novels, short stories, articles, reference works, magazine, newspaper and journal articles, pamphlets, web pages, and so forth. It is also contemplated that the information being classified could be available in any manner, (printed, electronically, etc), or even out of print and not available. The key is that other users will have some idea about what the information is, so that they can classify that information in their own way, and optionally add commentary as well. All types of links to the information are also contemplated, including cold or hot links to URLs, tile and author, publication volume, date, and page number, etc.

Existing systems and methods are readily distinguished.

Typical web pages are tagged using XML or some other metatagging system, but the taggers are not using an interface to select from a list of available tags. In addition, the authors are tagging their own materials; they are not classifying third party information. Still further, where different web page authors tag links to the same material, there is no system or method that facilitates that tagging, and makes the various sets of tags available to other entities for searching.

The common search engines, (Yahoo!™, Google™, Alta Vista™, Microsoft™, and so forth), classify third party information (i.e., web pages of others) but do so using their own agents. Thus, the classifications are not done by independent users. Still furthermore, those systems provide only a single (albeit possibly complex) classification. They do not provide inconsistent classifications to the same information. The fee-for-service database providers, such as Lexis™ and Westlaw™, are similar to the free search engines in that the classification is done by an agent of the database provider, which (or who) is therefore not independent.

The systems and methods disclosed in my earlier patents, U.S. Pat. Nos. 6,035,294, 6,195,652, and 6,243,699, contemplate users classifying information that they originated, and that is intrinsic to (i.e., stored within) the database. Thus, if a user adding an entry according to those earlier patents stores and classifies a book review, the content of that review would presumably be original to the user to avoid copyright problems, (and would therefore not be third party information), and in any event would be intrinsic to the database (and therefore not extrinsic). In contrast, a user employing systems and methods contemplated in this application would classify and perhaps comment on a book review originated by another, and rather than store the book review, would instead provide information to locate that extrinsic book review, using URL or other link, title, author, date, or perhaps some other information.

Some sites such as Amazon (http://www.amazon.com), allow independent users to comment on books, music and other third party information, and those comments can be (and often are) inconsistent with each other. But the comments are not classifications, and are in any the event the comments are posted in a freeform manner. Thus, they are not based in whole or in part on pre-defined classifications.

DETAILED DESCRIPTION

FIGS. 1A-1F, 2A-2C, 3 and 4 generally depict an interface 10 which includes title 20 and navigation section 30, a classification section 40, an information section 50; a comment section 60, and a sponsored links or other advertising section 70. Each of the sections can be considered its own interface, as can each of the fields within the sections.

Navigation section 30 is shown here as having six radio buttons. The Find-Results button is used to search for records according to information inputting or otherwise appearing in sections 40, 50, and 60. The Alert button is used to clone the current search, and then sent emails or other alerts to the user as new records are added that satisfy the search criteria. The User button is used to add, modify, or delete user identification and pass code information, and very likely various demographic, psychographic and other information about the user. The Publish button is used to store a classification and optionally a comment about an item of information, and to make that classification and comment available to others. The Private button is also used to store a classification and optionally a comment about an item of information, but the classification and comment are not available to others, or is restricted in some manner. The Private button should prove quite useful for a user to build his/her own library of links to interesting information, while classifying that information in a custom fashion. The Add-Information button is used to publish information through the system, for classification and comment by others. Thus, a user might have a previously unpublished short story that he wants the world to see, and could use the Add-Information button to get that story out to the world.

Section 40 includes two columns, a Topics column 41, and a Keywords column, 42. Each row has a paired set of Topic and Keywords. In this particular example, a user can classify the item of information identified in section 50 using up to seven designators. The ▼ symbol indicates that there is a list of available choices from which the user can choose.

Section 50 has six boxes, Author/Originator 51, Information Type 52, Information Source 53, Information Date 54, Title 55, and Link To Information 56. These boxes receive or select filtering criteria, and should be self explanatory.

Section 60 has four boxes, Commentator 61, Comment Date 62, Expiration Date 63, and Comment 64. Boxes 61-63 can be used to receive or select filtering criteria. Box 64 allows a user to input his comment.

Section 70 is for advertising. This section is completely optional, but is thought to be useful to generate revenue for the system. The particular advertisements preferably correspond in some way to the classifications, item of information, and/or user. The specific advertisements depicted in this application are exemplary only.

Figure 1A:
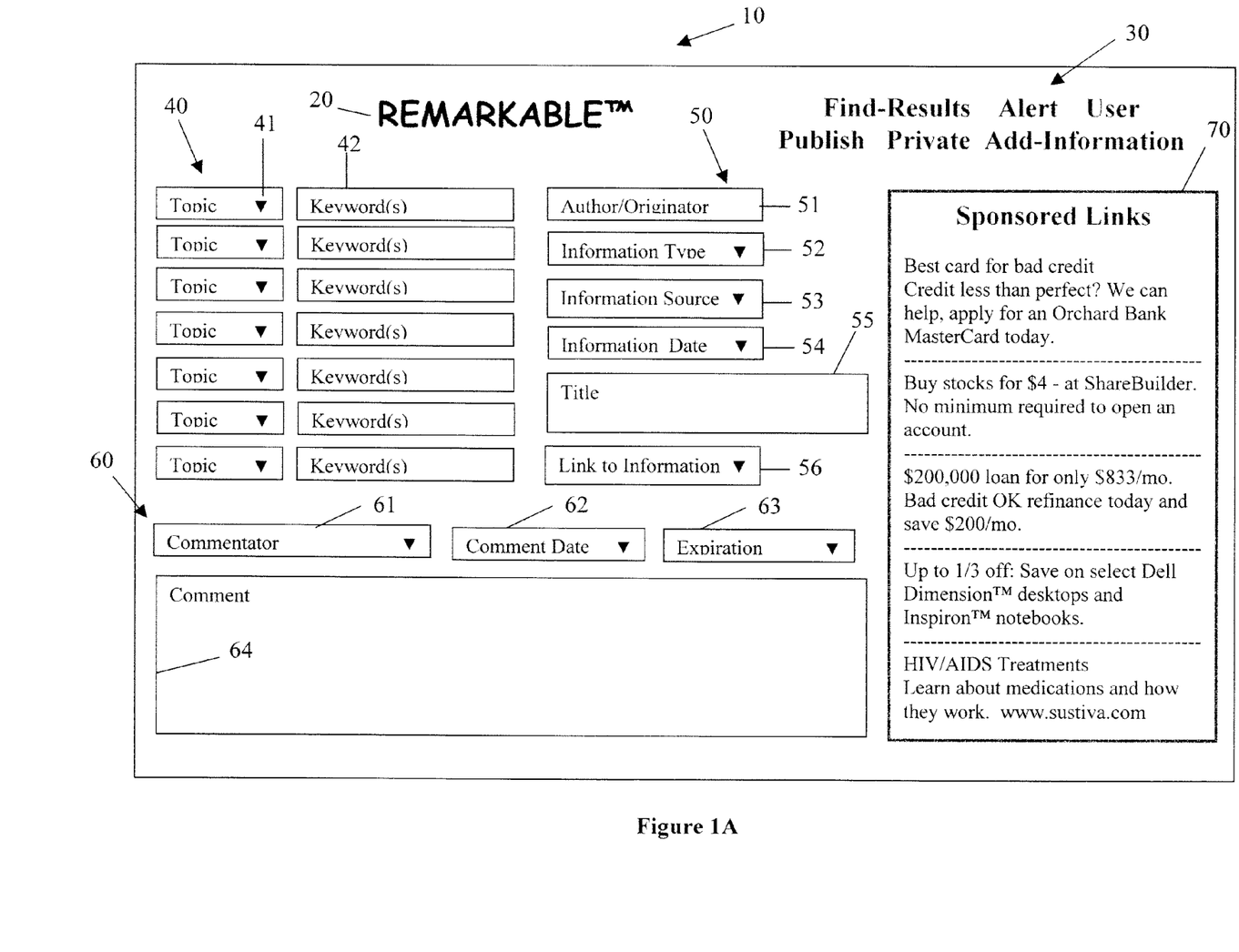
FIGS. 1A-1F are mock-ups of a sample search/comment interface at different stages of data entry, and showing related pop-up windows.
Figure 1B:
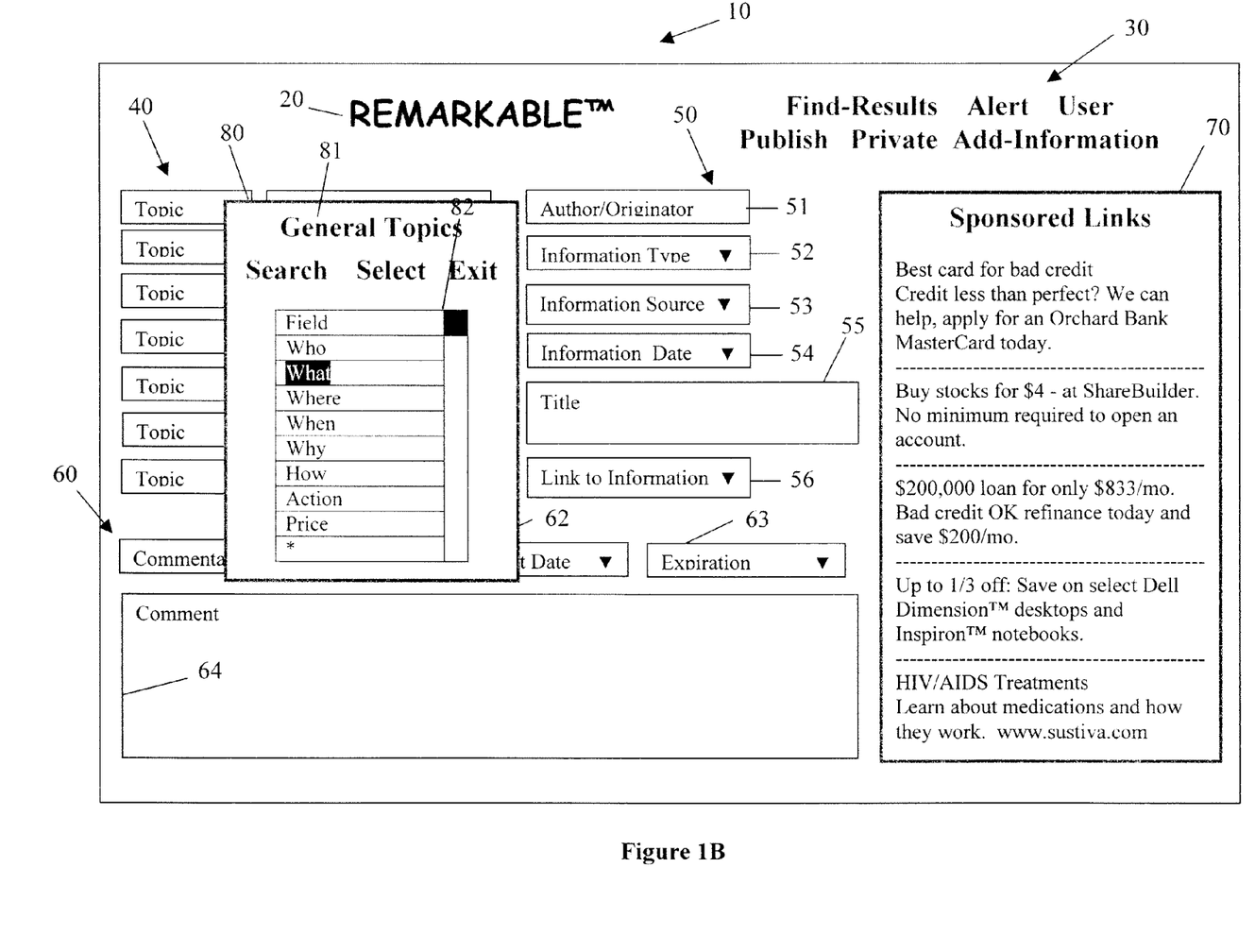

FIG. 1B depicts a pop up window 80 that includes title and navigation buttons, as well as a table 82 listing available choices for Topic. As noted above these particular choices correspond to a particular embodiment, and should be viewed as emblematic of all possible logical classification systems, whether one, two, three-level, whether textual, numeric, or otherwise. The "*" at the bottom of table 82 depicts that the user has an ability to add a new topic. For this higher level topic it is contemplated that user additions would be considered as suggestions, and would not be made generally available unless approved by an operator or other agent of the system. In this particular mock-up, the user has chosen the top level Topic "What", which appears in the top box of column 41 of FIG. 1C.

Figure 1C:
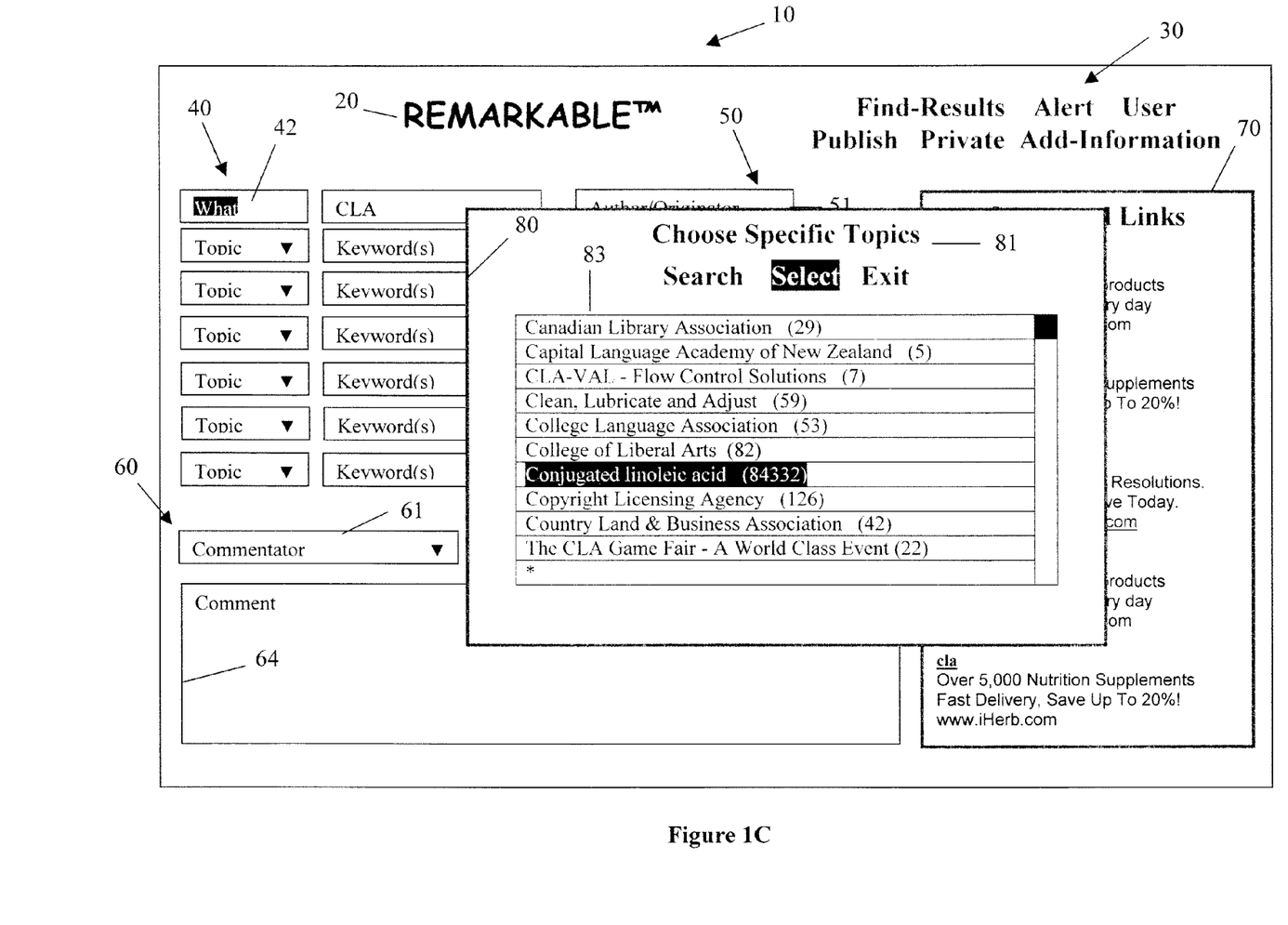

FIG. 1C depicts another instance of pop up window 80, which again includes title and navigation buttons. But here the window includes a table 83 listing available choices for general (top level) topic selected in table 82. Since there are likely thousands upon thousands of specific (bottom level) topics, it behooves a user to filter for a relevant subset using keywords, and preferably Boolean logic. In this particular instance the user is shown as having entered only a single keyword CLA, and thereupon was shown the list in table 83. The "*" once again designate that users can add their own topics to this. But here, in distinction to table 82, new entries are likely to be made available to other users immediately, subject to post addition review by an operator or other agent of the system. In this particular mock-up, the user has chosen the bottom level Topic "Conjugated linoleic acid", which appears in the top box of column 42 of FIG. 1C.

Figure 1D:
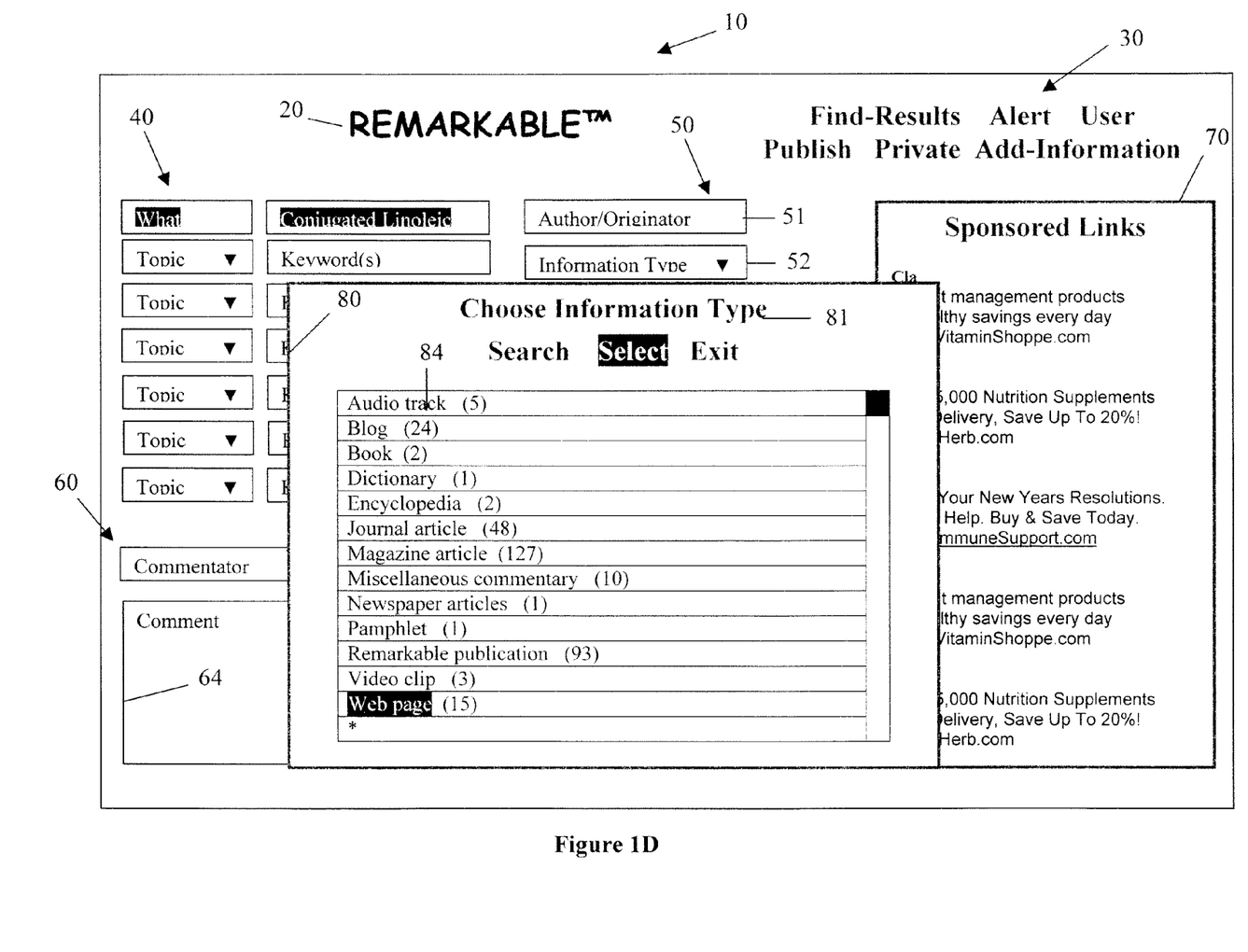

FIG. 1D depicts yet another instance of pop up window 80, which again includes title and navigation buttons. Here the window includes a table 84 that lists available choices for the Information Type to be inserted into box 52. A user could presumably employ keyword filters, but since the list is probably relatively small, the user would more preferably would just click on the ▼ symbol to trigger showing of the list. The "*" once again designate that users can add their own topics to the table, which would likely be subject to only post addition review by an operator or other agent of the system. In this particular mock-up, the user has chosen Web Page, which appears in box 52 of FIG. 1E.

Figure 1E:
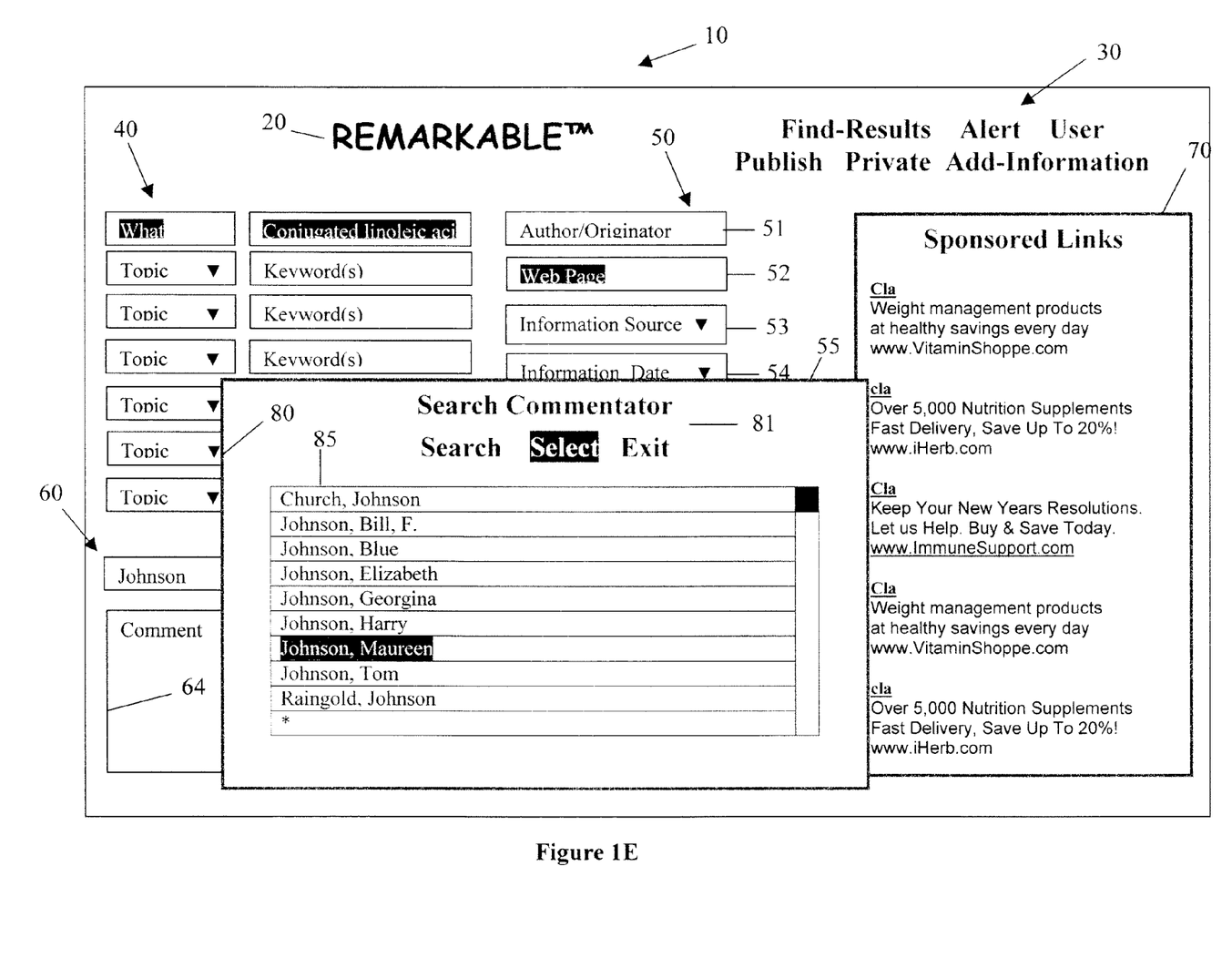

FIG. 1E depicts yet another instance of pop up window 80, which again includes title and navigation buttons. Here the window includes a table 85 that lists available choices for the Commentator to be inserted into box 61. A user could presumably employ keyword filters due to the large number of names, and in this mock-up has entered the word "Johnson". In response, the system lists names containing that keyword in table 85. The "*" once again designate that users can add their own topics to the table, which would likely be subject to only post addition review by an operator or other agent of the system. In this particular mock-up, the user has chosen Maureen Johnson, which appears in box 61 of FIG. 1F.

Figure 1F:
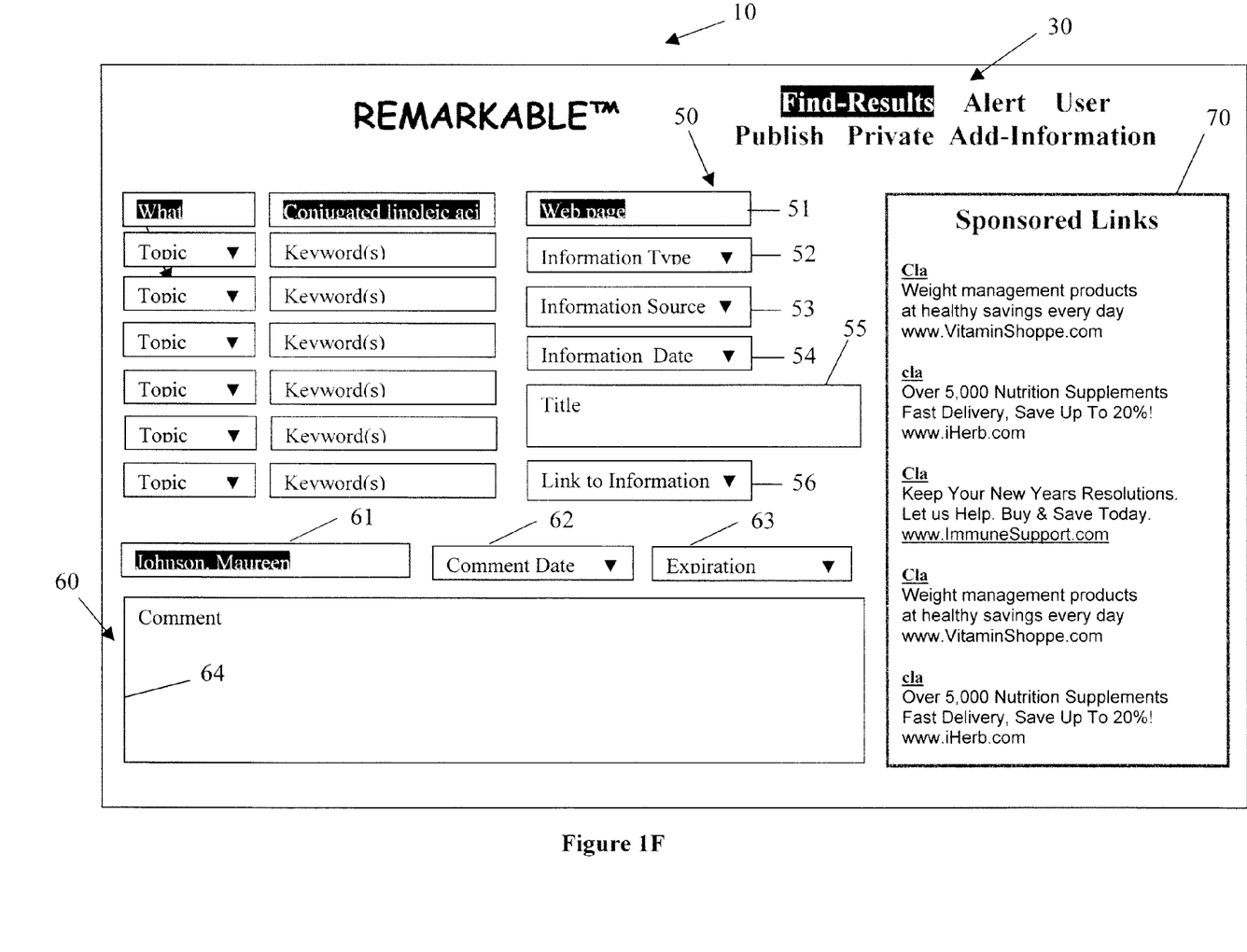

FIG. 1F depicts the interface 10, now configured for a search. In this particular mock-up, the user clicks on the Find-Results button of section 30, and is thereupon presented with the results shown in mock-up FIG. 1G.

Figure 1G:
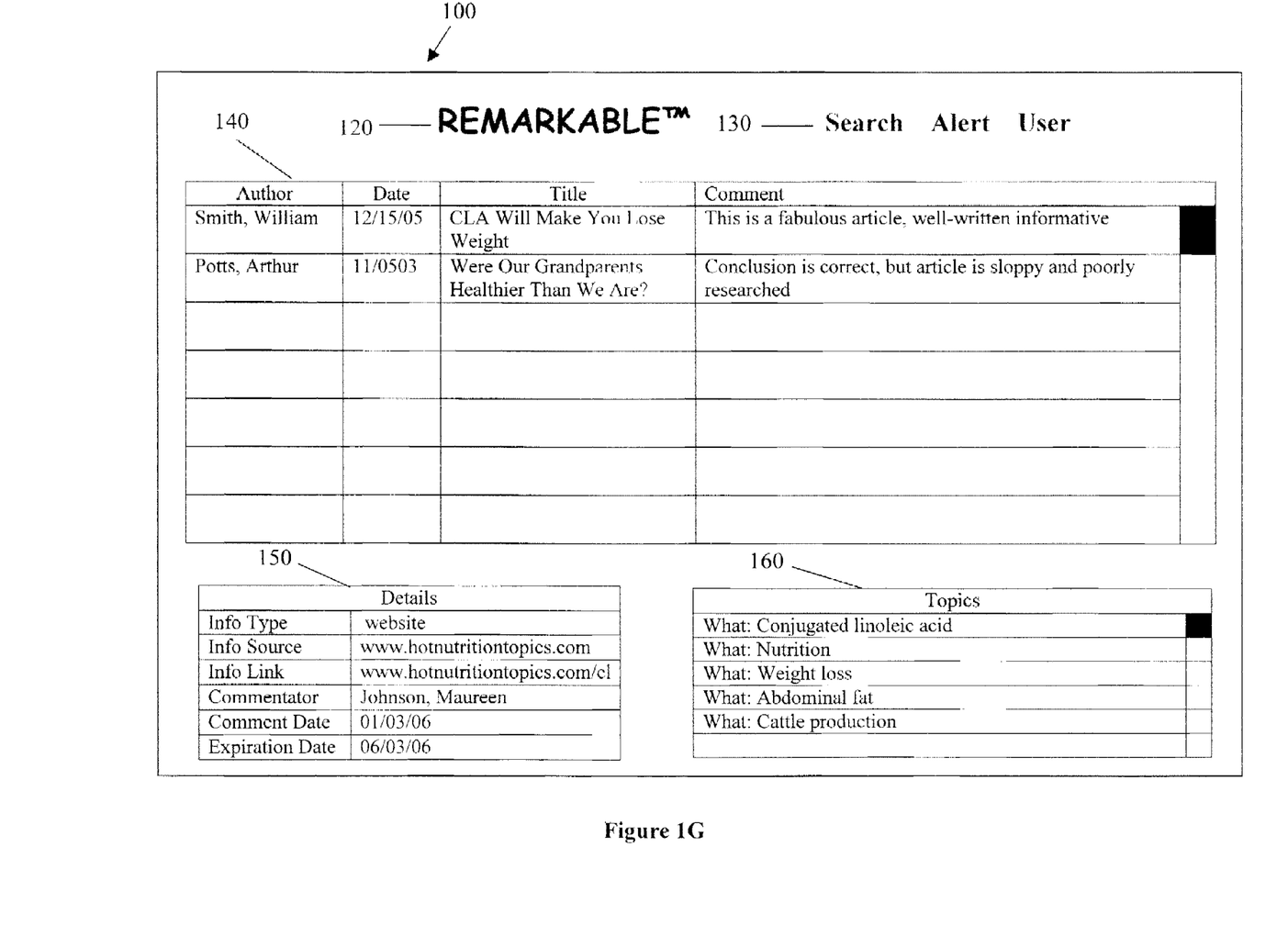
FIG. 1G is a mock-up of a sample results interface that might result from use of one of the search interfaces.

FIG. 1G depicts a results interface 100, generally having a title 120, a navigation section 130, a general results table 140, a Details table 150, and a Topics table 160. In this particular embodiment, tables 150 and 160 provide specific details as to rows selected in table 140. There are any number of other presentations and formats which could be used.

Figure 2A:
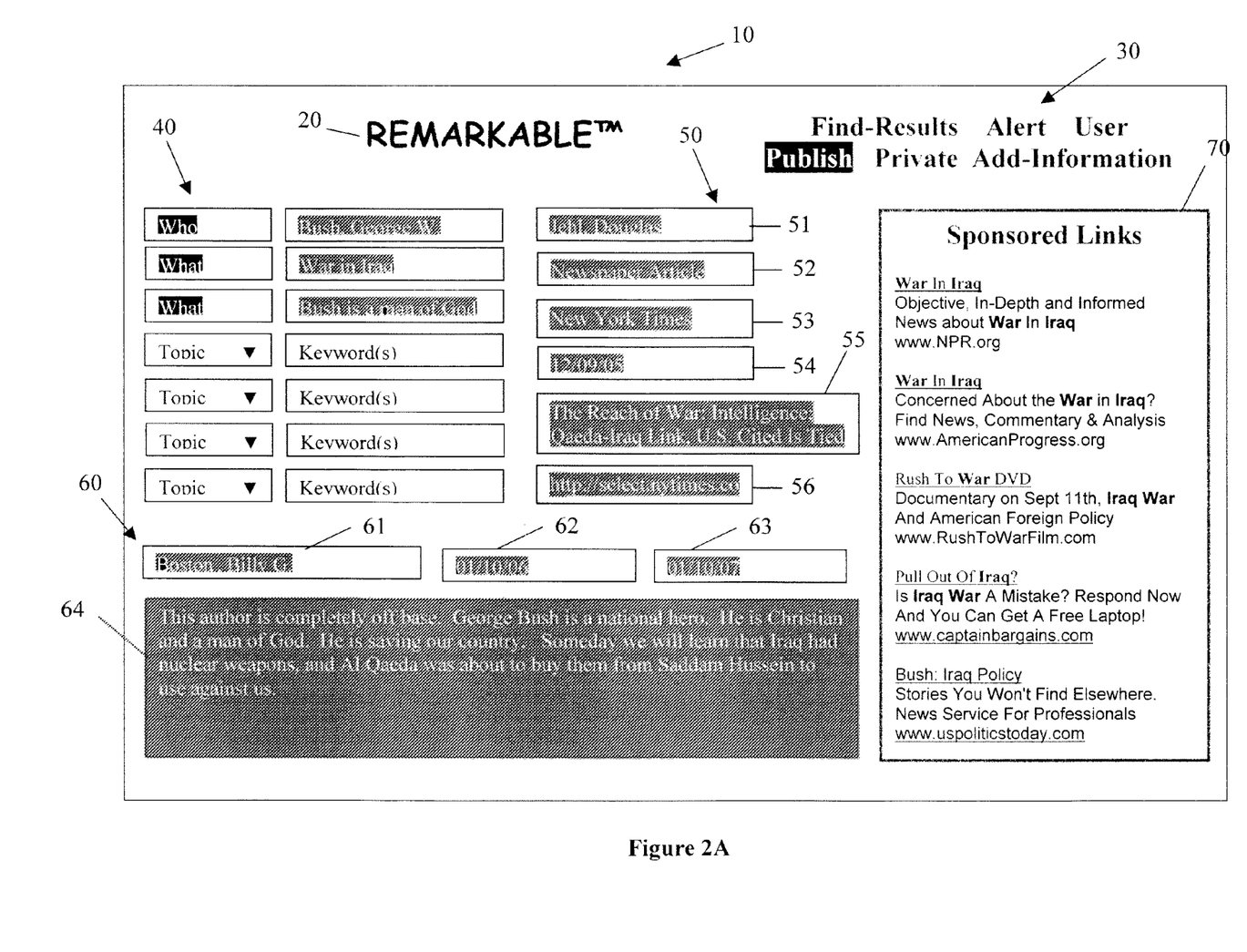
FIGS. 2A-2B are mock-ups of a sample search/comment interface in which a user has added various comments.
Figure 2B:
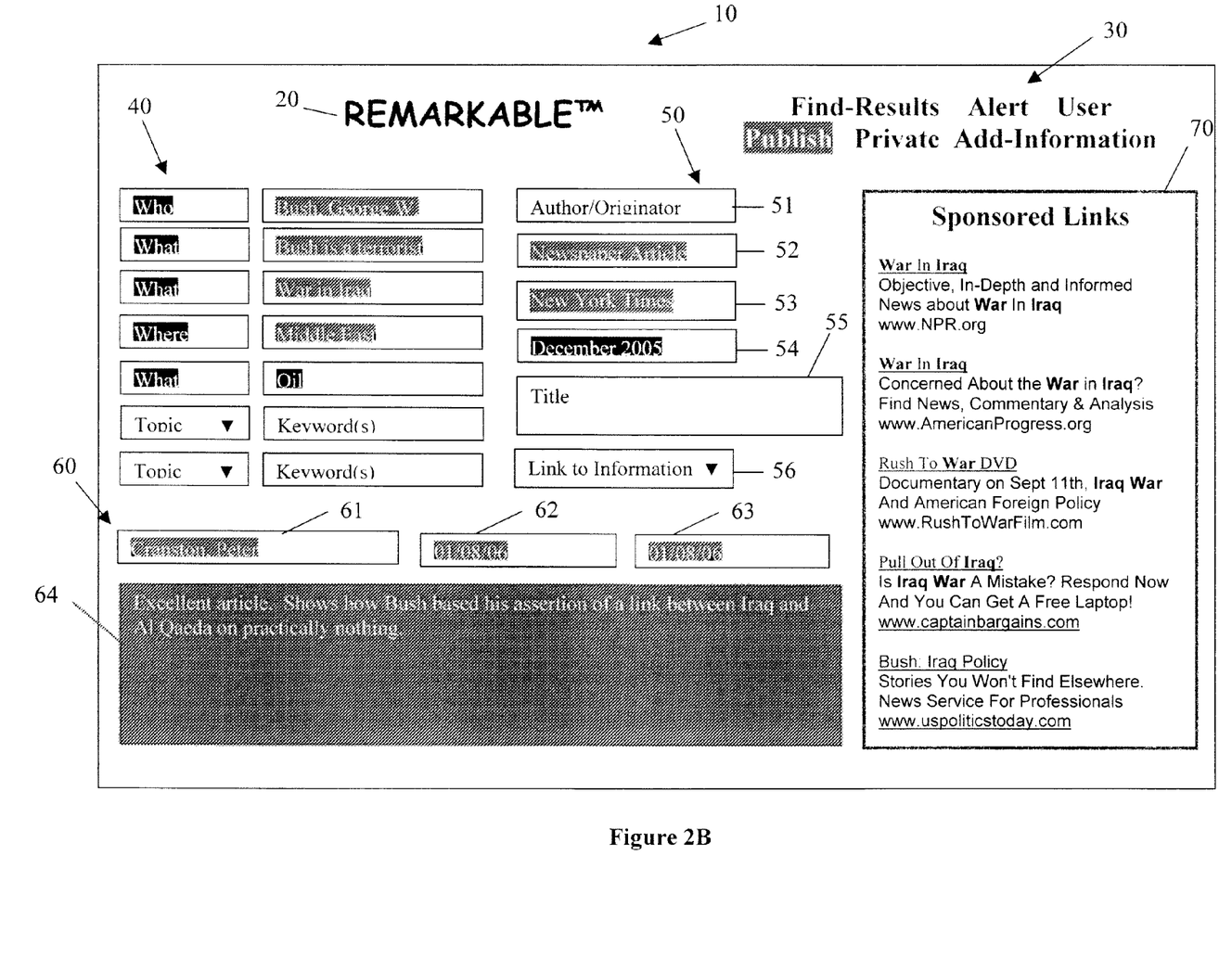
Figure 2C:
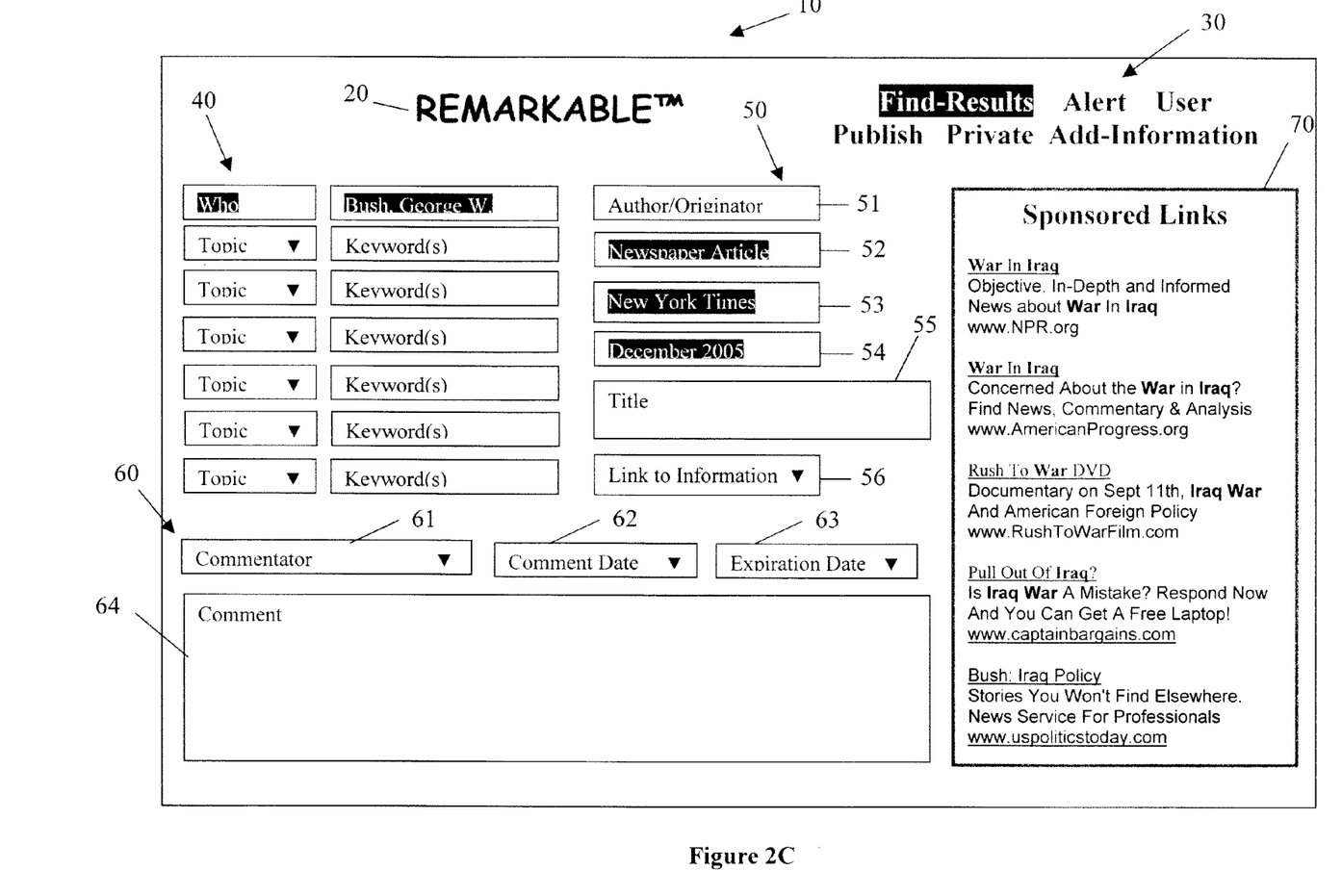
FIG. 2C is a mock-up of a sample search/comment interface in which a user has entered search criteria and clicked the Find-Results button.
Figure 2D:
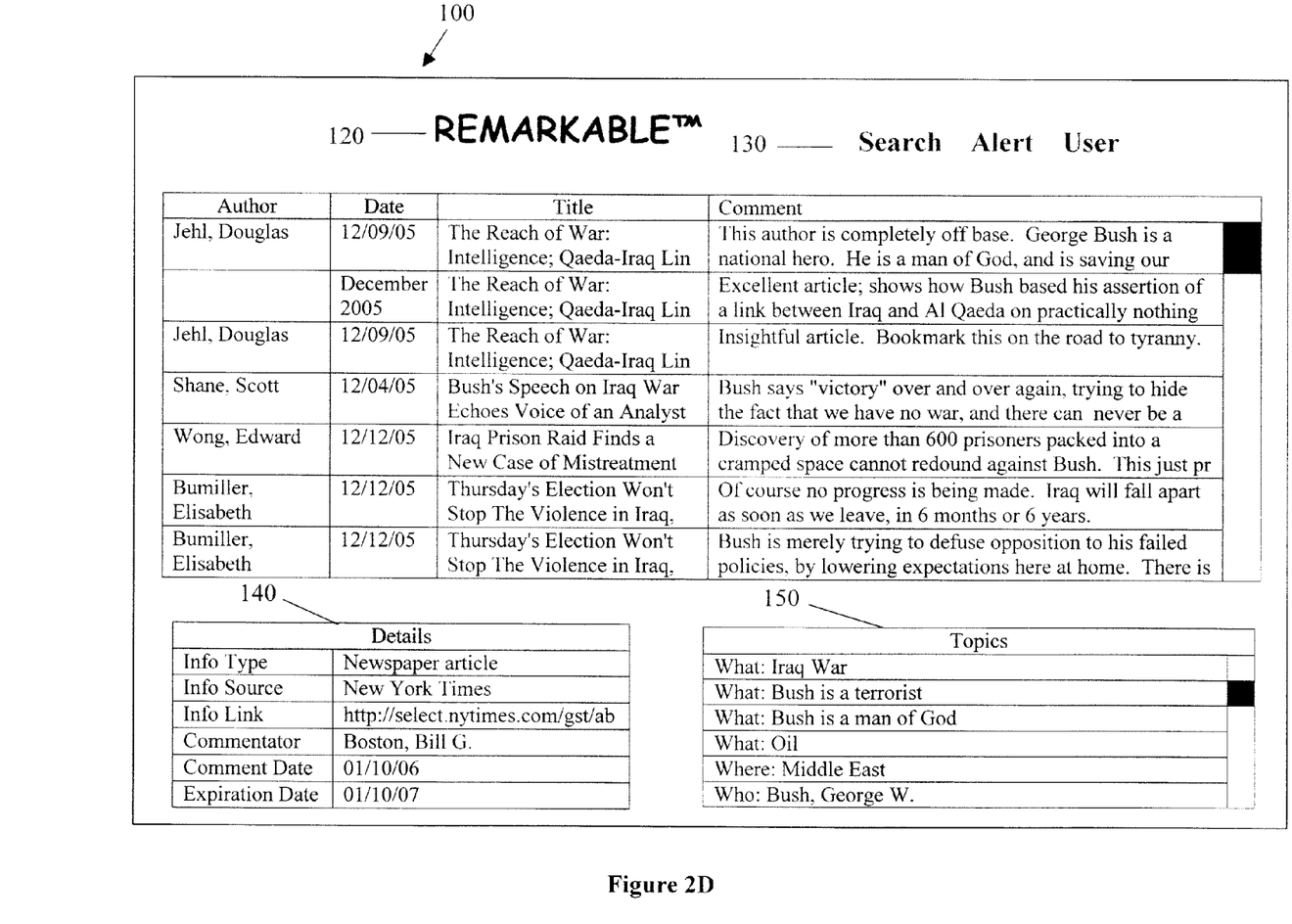
FIG. 2D is a mock-up of a sample results interface that might result from data entry according to FIG. 2C.

FIG. 2A depicts a mock-up of the interface 10, in which the user has selected or entered the material included in reverse text. He has then clicked on the Publish button in section 30 to create a record that can subsequently be searched by others. FIG. 2B depicts a mock-up of the interface 10, in which a second user has selected or entered the material included in reverse text, and that person has also selected the Publish button in section 30 to create a record that can subsequently be searched by others. In FIG. 2C a third user has selected or entered the material included in reverse text, and clicked on the Find-Results button in section 30, which triggers the system to produce the listings set forth in FIG. 2D.

Figure 3:
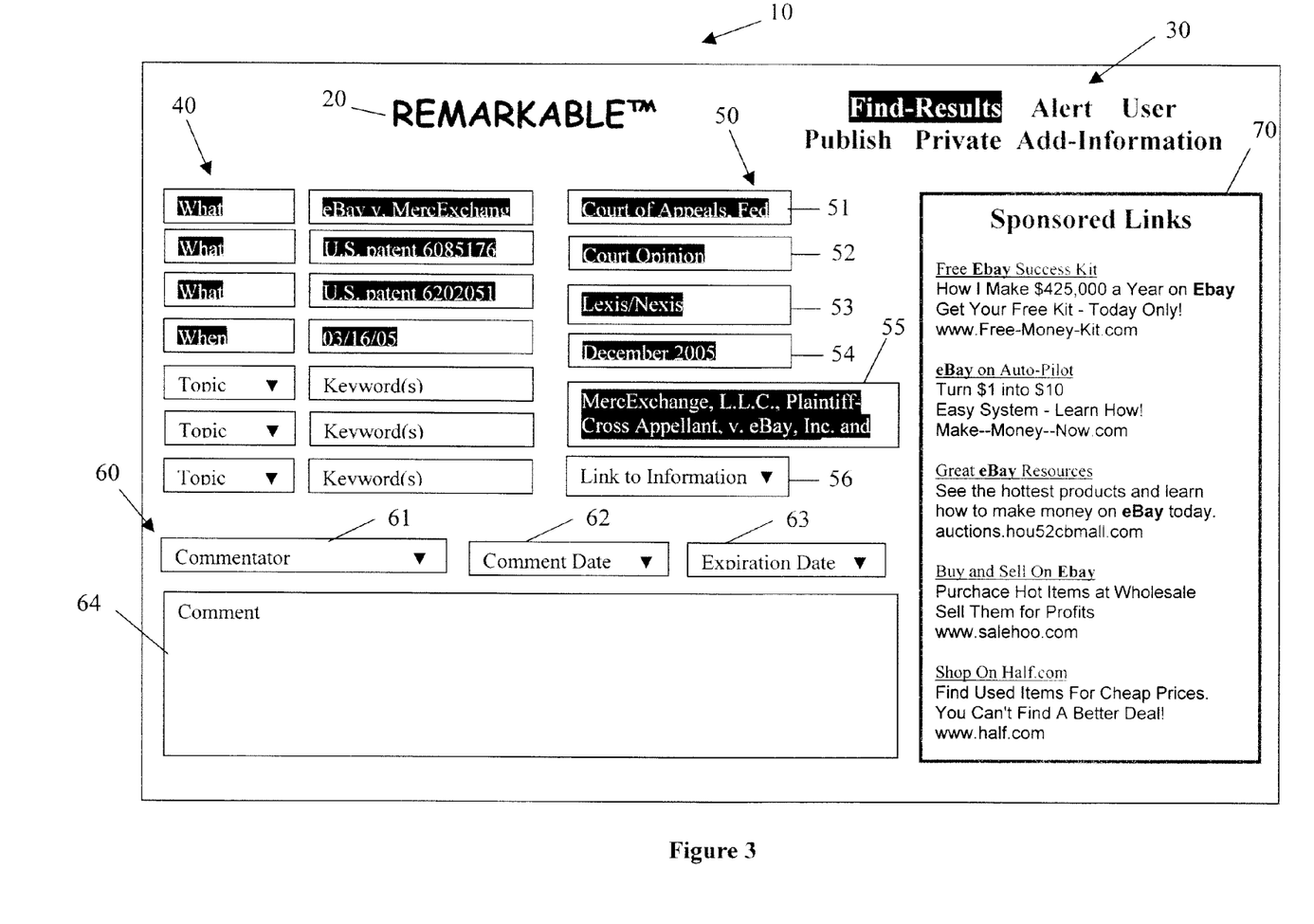
FIG. 3 is another example of a mock-up of a sample search/comment interface in which a user has entered search criteria and clicked the Find-Results button.

FIG. 3 is another example of a user conducting a search using classifications entered by other users. In this case the item of information is a court opinion, and rather than using pure keyword searching, or relying on the West™ Key™ system, the searcher is taking advantage of classifications by attorneys and others who have chosen to classify that case.

Figure 4:
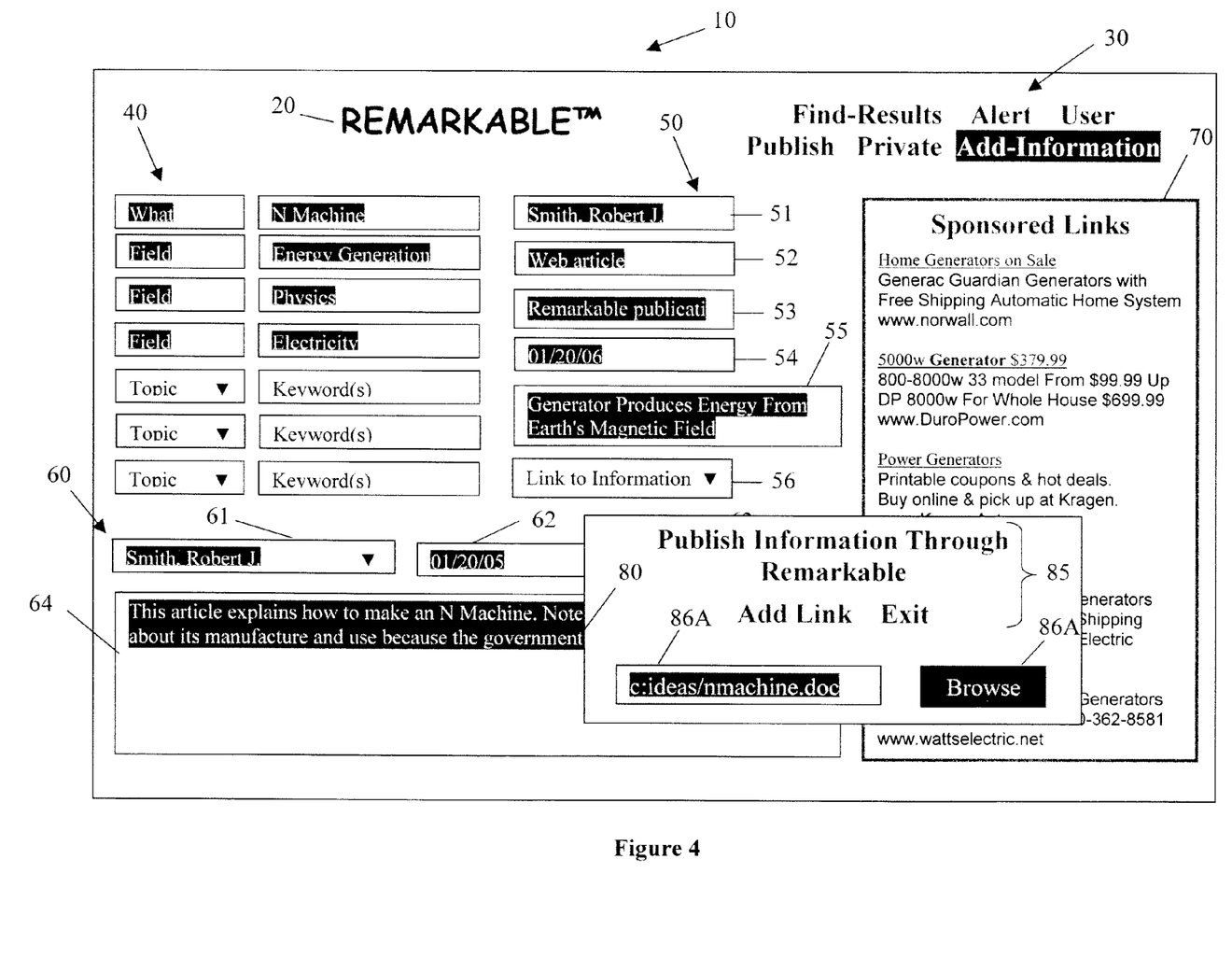
FIG. 4 is a mock-up of a sample data entry interface in which a user is adding information that can be searched by others.

In FIG. 4 a user has selected or entered the material included in reverse text. He has then clicked on the Add-Information button in section 30 to create a record that can subsequently be searched by others. The difference here is that the item of information was not previously published. The user clicked on the ▼ symbol to trigger the interface 80, which in this instance includes a facility for browsing his computer (or elsewhere) to identify a file that can be published. The system will then publish the file, which the user has indicated should be viewed as a Web article. The system will then automatically include the URL of the publication in box 56.

Figure 5:
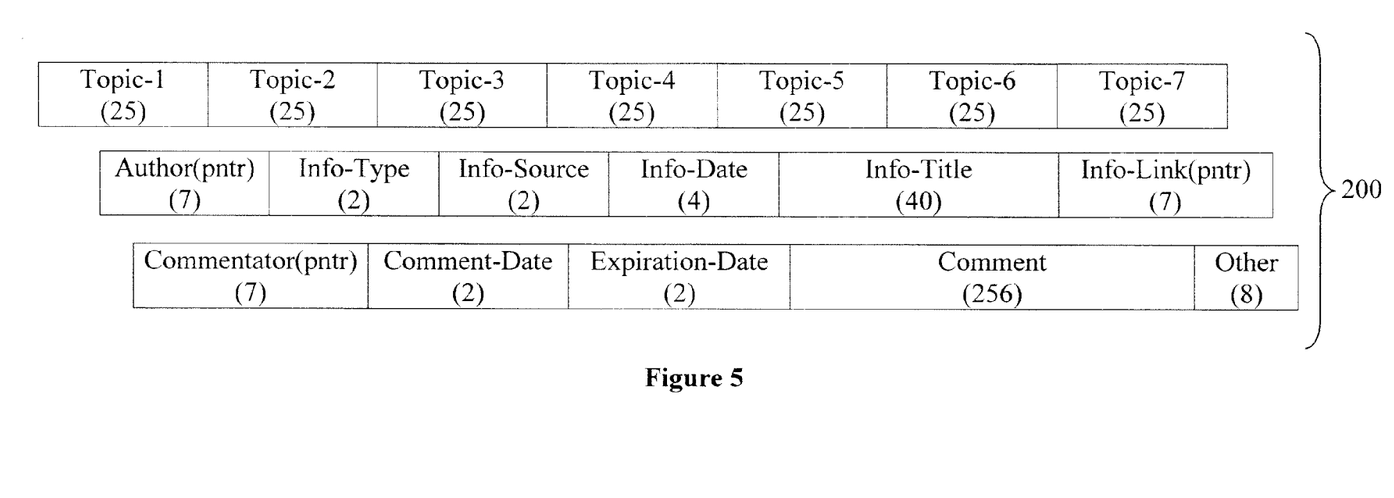
FIG. 5 is schematic for a preferred record layout for storing classifications, author/item identification, and commentator/comment information.

FIG. 5 depicts a preferred record for storing the classifications, author/item identification, and commentator/comment information as discussed above. In this particular instance the record has a fixed length of 512 bytes, with fixed field lengths as shown in parentheses. "Pntr" refers to a pointer, which would likely be a record number of another file. Thus, there might be an author's or person's file, with fields for last name, first name, middle name or initial, and possibly other information. A record number of that file would then be inserted into a field for Author(pntr). The topics can be stored using pointers, literals, or any combination. While the most preferred is currently all text (to speed up searching), contemplated formats include the following:

what:Conjugated linoleic acid
23115:Conjugated linoleic acid
what:888874316
23115:888874316

It should be apparent to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for searching for classified information, comprising:
    a list of pre-defined classification designators stored in a database;
    a first electronic interface comprising a first computer executing a first set of software instructions stored on a first computer readable medium configured to allow first and second independent users to classify a third party item of information in inconsistent ways, using first and second different pluralities of the designators according to a first and a second, different topic, respectively, by:
        (a) allowing each of the first and the second users to independently select their respective topics from the list of pre-defined classification designators as a classification for the item via the first electronic interface;
        (b) allowing the first user to use a first keyword and the first topic to search the first plurality of designators and to select a first designator for the first topic from the first plurality of designators; and
        (c) allowing the second user to use a second keyword and the second topic to independently search the second plurality of designators and to select a second, different designator for the second topic from the second plurality of designators;
    a storage device storing a first record comprising the first topic and first designator, and a second record comprising the second topic and the second designator, where both records are linked with the item of information; and
    a second electronic interface comprising a second computer executing a second set of software instructions stored on a second computer readable medium configured to allow a third independent user to locate the item of information by searching records on the storage device using subsets of the different first and second pluralities of the designators as keywords.

2. The system of claim 1, further comprising a third electronic interface comprising a third computer executing a third set of software instructions stored on a third computer readable medium configured to allow the first independent user to associate the item with at least one of a source of the item, a date the item, and an author of the item.

3. The system of claim 1, wherein at least one of the designators has a length of at least three words.

4. The system of claim 1, further comprising software that associates the first plurality of the designators with the item in a fixed length record.

5. The system of claim 1, the first electronic interface further comprising software that associates the first plurality of the designators with: (a) the item; and (b) a comment originated by the first independent user.

6. The system of claim 5, wherein the comment has a length of at least ten words.

7. The system of claim 5, the second electronic interface further comprising software that implements a protocol by which the third independent user can narrow a search result set containing a link to the item by searching for words within the comment.

8. The system of claim 1, further comprising a record that stores a link to the item, and text of the first pluralities of the designators.

9. The system of claim 1, further comprising a record that stores a link to the item, and a plurality of codes representing individual designators of the first pluralities of the designators, respectively.

10. The system of claim 1, further comprising software that examines at least a portion of the item, and suggests candidate topics from the list to the first independent user.

11. The system of claim 1, the first electronic interface further comprising software that allows the first independent user to search for designators from the list using text searches against the list.

12. The system of claim 1, the first electronic interface further comprising software that additionally allows the first independent user to classify the item using a designator that is not included in the list.

13. The system of claim 1, the first electronic interface further comprising software that additionally allows the first independent user to classify the item using a designator that is added directly to the list by the first independent user.

14. The system of claim 1, the first electronic interface further comprising software that additionally allows the first independent user to classify the item using a designator that is added indirectly to the list by the first independent user.

15. The system of claim 12, further comprising a guide that provides the first independent user with a listing regarding previous usage of subsets of the designators by others.

16. The system of claim 1, wherein the item comprises at least one of a blog, a news report, and an article published in a print media.

17. The system of claim 1, wherein the item comprises at least one of a moving image and a sound track.

18. The system of claim 1, wherein the comment comprises at least one of a moving image and a sound track.

19. The system of claim 1, wherein the item of information is stored extrinsically to the system.

20. A method of facilitating a search for classified information, comprising:
    providing a set of pre-determined topics stored in a database;
    providing a first electronic interface comprising a first computer executing a first set of software instructions stored on a first computer readable medium, the interface configured to allow a first user to electronically associate extrinsic third party content with a first subset of the topics;
    providing a second electronic interface comprising a second computer executing a second set of software instructions stored on a second computer readable medium, the second interface configured to allow a second user to electronically associate the content with a second different subset of the topics, which can be inconsistent with the first subset; and allowing the first and the second users to use search terms to independently search the first and second subset of topics, respectively, and to select a first and a second, different keyword respectively, where the first and second keywords are selected from the first and the second subsets of topics, respectively;

storing on a storage device a first topic—keyword pair comprising the first keyword, and a second topic—keyword part comprising the second keywords, in records having links to the content; and providing a third electronic interface comprising a third computer executing a third set of software instructions stored on a third computer readable medium, the third interface configured to allow a third user to electronically access the storage device and to search for the content by keying on at least portions of either of the first and second subsets.

21. The method of claim 20, wherein the step of allowing a first user to electronically associate the content comprises building and storing a first record that identifies the first subset of the topics, and the step of allowing a second user to electronically associate the content comprises building and storing a second record that identifies the second subset of the topics.

22. The method of claim 21, further comprising allowing the first and second users to add comments to first and second records, respectively.

23. The method of claim 22, wherein the step of allowing a third user to electronically access the content further comprises allowing the third user to perform a search against the comments.

24. The method of claim 22, wherein at least one of the comments contains text.

25. The method of claim 22, wherein at least one of the comments contains at least one of audio and video.

26. The method of claim 20, further comprising organizing the set of pre-determined topics in a list, and presenting at least portions of the list to each of the first and second users, respectively.

27. The method of claim 21, further comprising allowing the first and second users to at least indirectly add new topics to the list.

28. The method of claim 27, wherein the step of allowing the first and second users to add new topics to the list is provisional, subject to acceptance by an agent that implements the method.

\* \* \* \* \*